United States Patent
Siu et al.

(10) Patent No.: US 10,336,436 B2
(45) Date of Patent: Jul. 2, 2019

(54) TORQUE AND THRUST CONTROL OF A PROPELLER

(71) Applicant: SIKORSKY AIRCRAFT CORPORATION, Stratford, CT (US)

(72) Inventors: Sunny K. Siu, Hamden, CT (US); Cody Fegely, Milford, CT (US); Kenneth S. Wittmer, Sandy Hook, CT (US); John Knag, New Boston, NH (US); Aaron L. Greenfield, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/329,411

(22) PCT Filed: Sep. 28, 2015

(86) PCT No.: PCT/US2015/052622
§ 371 (c)(1),
(2) Date: Jan. 26, 2017

(87) PCT Pub. No.: WO2016/053862
PCT Pub. Date: Apr. 7, 2016

(65) Prior Publication Data
US 2017/0210461 A1   Jul. 27, 2017

Related U.S. Application Data
(60) Provisional application No. 62/057,373, filed on Sep. 30, 2014.

(51) Int. Cl.
*B64C 11/44* (2006.01)
*B64C 27/10* (2006.01)
*B64C 27/82* (2006.01)

(52) U.S. Cl.
CPC .............. *B64C 11/44* (2013.01); *B64C 27/10* (2013.01); *B64C 27/82* (2013.01);
(Continued)

(58) Field of Classification Search
None
See application file for complete search history.

(56) References Cited

U.S. PATENT DOCUMENTS 2,645,293 A * 7/1953 Ogle ........................ F02C 9/58
                                                    416/28
2,751,026 A * 6/1956 Lee, II .................... B64C 11/38
                                                    416/28
(Continued)

OTHER PUBLICATIONS

International Search Report and Written Opinion; International Application No. PCT/US2015/052622; International Filing Date: Nov. 12, 2015; dated Dec. 17, 2015; 12 pages.

*Primary Examiner* — Rami Khatib
(74) *Attorney, Agent, or Firm* — Cantor Colburn LLP

(57) ABSTRACT

A method for controlling a propeller of an aircraft, comprises receiving, with a processor, one or more signals indicative of commanded collective pitch of the propeller; receiving, with the processor, one or more sensed signals indicative of propeller axial speed, propeller rotational speed, and air density; estimating, with the processor, a propeller torque and propeller thrust from one or more of the propeller axial speed, the propeller rotational speed, and the air density; determining, with the processor, information indicative of an error value between a desired torque and a measured torque in the propeller; determining, with the processor, information indicative of a corrected pitch command in response to the determining of the error value; combining, with the processor, the corrected pitch command
(Continued)

with the propeller rotational speed into an adjustment solution; providing, with the processor, the propeller with the adjustment solution.

20 Claims, 5 Drawing Sheets

(52) U.S. Cl.
CPC ............... *B64C 2027/8236* (2013.01); *B64C 2027/8272* (2013.01); *B64C 2027/8281* (2013.01)

(56) References Cited

U.S. PATENT DOCUMENTS

| | | |
|---|---|---|
| 2,957,655 A | 10/1960 | Knapp et al. |
| 5,174,718 A | 12/1992 | Lampeter et al. |
| 5,315,819 A * | 5/1994 | Page .................. F02C 9/28 |
| | | 416/30 |
| 5,416,699 A | 5/1995 | Divalentin et al. |
| 6,171,055 B1 | 1/2001 | Vos et al. |
| 7,758,310 B2 | 7/2010 | Cotton et al. |
| 2013/0306787 A1 | 11/2013 | Marton et al. |
| 2014/0023499 A1* | 1/2014 | Collingbourne ...... B64C 11/305 |
| | | 416/1 |
| 2014/0039775 A1 | 2/2014 | Lickford et al. |

* cited by examiner

TORQUE AND THRUST CONTROL OF A PROPELLER

CROSS REFERENCE TO RELATED APPLICATIONS

This application is a National Stage application of PCT/US2015/052622, filed Sep. 28, 2015, which claims the benefit of U.S. Provisional Application No.: 62/057,373, filed Sep. 30, 2014, both of which are incorporated by reference in their entirety herein.

BACKGROUND

The subject matter disclosed herein relates generally to the field of rotating blades and, more particularly, to a method of controlling a propeller in an aircraft having a controller that limits a commanded pitch of a propeller within torque and thrust limitations or controls the pitch in order to maintain a constant torque of the propeller.

DESCRIPTION OF RELATED ART

Traditional aircraft with fixed-pitch propellers are optimized for either takeoff or climb as the efficiency of the engine is non-linear and a function of propeller speed. Aircraft equipped with constant speed propellers adjust the blade pitch to maintain the desired propeller speed thereby maximizing engine performance and efficiency over varying flight conditions. However, these constant speed propellers require a cluster of mechanical parts that add weight and complexity to the propeller design as well as reduce their reliability. Further, variable-pitch propellers can exceed structural limits of the airframe when operated in off-design conditions. An electronic controller for a variable pitch propeller that limits over-thrust or over-torque, or one which maintains a constant torque would be well received in the art.

BRIEF SUMMARY

According to one aspect of the invention, a method for controlling a propeller of an aircraft, comprises receiving, with a processor, one or more signals indicative of commanded collective pitch of the propeller; receiving, with the processor, one or more sensed signals indicative of propeller axial speed, propeller rotational speed, and air density; estimating, with the processor, a propeller torque and propeller thrust from one or more of the propeller axial speed, the propeller rotational speed, and the air density; determining, with the processor, information indicative of an error value between a desired torque and a measured torque in the propeller; determining, with the processor, information indicative of a corrected pitch command in response to the determining of the error value; combining, with the processor, the corrected pitch command with the propeller rotational speed into an adjustment solution, the propeller rotational speed being governed by a full authority engine controller; providing, with the processor, the propeller with the adjustment solution; and receiving, with the processor, a subsequent error value between the desired torque and the measured torque in response to the providing of the adjustment solution.

In addition to one or more of the features described above or below, or as an alternative, further embodiments could include determining an estimated upper limit of a collective pitch as a function of maximum torque and maximum thrust from a predefined schedule.

In addition to one or more of the features described above or below, or as an alternative, further embodiments could include determining an estimated lower limit for the collective pitch as a function of minimum torque and minimum thrust from a predefined schedule.

In addition to one or more of the features described above or below, or as an alternative, further embodiments could include determining each of an upper limit collective pitch command and a lower limit collective pitch command from the estimated upper and lower limits.

In addition to one or more of the features described above or below, or as an alternative, further embodiments could include adjusting the corrected pitch command as a function of at least one of the commanded collective pitch, the propeller axial speed, and the propeller rotational speed.

In addition to one or more of the features described above or below, or as an alternative, further embodiments could include determining a pitch rate from the commanded collective pitch, the estimated torque, and the estimated thrust.

In addition to one or more of the features described above or below, or as an alternative, further embodiments could include applying each of a lower limit constant value and pitch rate limiting value to the commanded collective pitch to drive down the commanded collective pitch to the lower limit constant value, the lower limit constant value representing a safe lower limit of a collective pitch.

In addition to one or more of the features described above or below, or as an alternative, further embodiments could include applying the lower limit constant value if at least one of the propeller thrust or the propeller torque is greater than its respective upper limit value.

In addition to one or more of the features described above or below, or as an alternative, further embodiments could include applying each of an upper limit constant value and pitch rate limiting value to the commanded collective pitch to drive up the commanded collective pitch to the upper limit constant value, the upper limit constant value representing a safe upper limit of a collective pitch.

In addition to one or more of the features described above or below, or as an alternative, further embodiments could include applying the upper limit constant value if at least one of the propeller thrust or the propeller torque is lesser than its respective lower limit value.

According to another aspect of the invention, a system for controlling a plurality of propeller blades of an aircraft, comprise a propeller comprising the plurality of blades, wherein the propeller is associated with a sensor; a processor; and memory having instructions stored thereon that, when executed by the processor, cause the system to: receiving one or more signals indicative of commanded collective pitch of the propeller; receive one or more sensed signals indicative of propeller axial speed, propeller rotational speed, and air density; determine information indicative of an error value between a desired torque and a measured torque in the propeller; determine information indicative of a corrected pitch command in response to the determining of the error value; combine the corrected pitch command with the propeller rotational speed into an adjustment solution, the propeller rotational speed being governed by a full authority engine controller; provide the propeller with the adjustment solution; and receive a subsequent error value between the desired torque and the measured torque in response to the providing of the adjustment solution.

In addition to one or more of the features described above or below, or as an alternative, further embodiments could include the processor is configured to determine an estimated upper limit of a collective pitch as a function of maximum torque and maximum thrust from a predefined schedule.

In addition to one or more of the features described above or below, or as an alternative, further embodiments could include the processor configured to determine an estimated lower limit for the collective pitch as a function of minimum torque and minimum thrust from a predefined schedule.

In addition to one or more of the features described above or below, or as an alternative, further embodiments could include the processor configured to determine each of an upper limit collective pitch command and a lower limit collective pitch command from the estimated upper and lower limits.

In addition to one or more of the features described above or below, or as an alternative, further embodiments could include the processor configured to adjust the corrected pitch command as a function of at least one of the commanded collective pitch, the propeller axial speed, and the propeller rotational speed.

In addition to one or more of the features described above or below, or as an alternative, further embodiments could include the processor is configured to estimate a torque and thrust from one or more of the propeller axial speed, the propeller rotational speed, and the air density.

In addition to one or more of the features described above or below, or as an alternative, further embodiments could include the processor configured to apply each of a lower limit constant value and a pitch rate limiting value to the commanded collective pitch to drive down the commanded collective pitch to the lower limit constant value, the lower limit constant value representing a safe lower limit of a collective pitch.

In addition to one or more of the features described above or below, or as an alternative, further embodiments could include the processor is configured to apply the lower limit constant value if at least one of the propeller thrust or the propeller torque is greater than its respective upper limit value.

In addition to one or more of the features described above or below, or as an alternative, further embodiments could include the processor configured to apply each of an upper limit constant value and pitch rate limiting value to the commanded collective pitch to drive up the commanded collective pitch to the upper limit constant value, the upper limit constant value representing a safe upper limit of a collective pitch.

In addition to one or more of the features described above or below, or as an alternative, further embodiments could include the processor configured to apply the upper limit constant value if at least one of the propeller thrust or the propeller torque is lesser than its respective lower limit value.

Other aspects, features, and techniques of the invention will become more apparent from the following description taken in conjunction with the drawings.

Technical effects of embodiments include the capability of electronically maintaining a constant propeller rotational speed to improve efficiency regardless of flight conditions. Ease of maneuvering is provided by control laws that automatically adjust propeller blade pitch to maintain a desired rotor speed and torque setting, eliminating the risk of over-torquing the propeller gearbox. Weight savings and reduced complexity to the mechanical propeller design are other benefits due to the elimination of electrically or hydraulically driven blade pitch changing mechanism.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
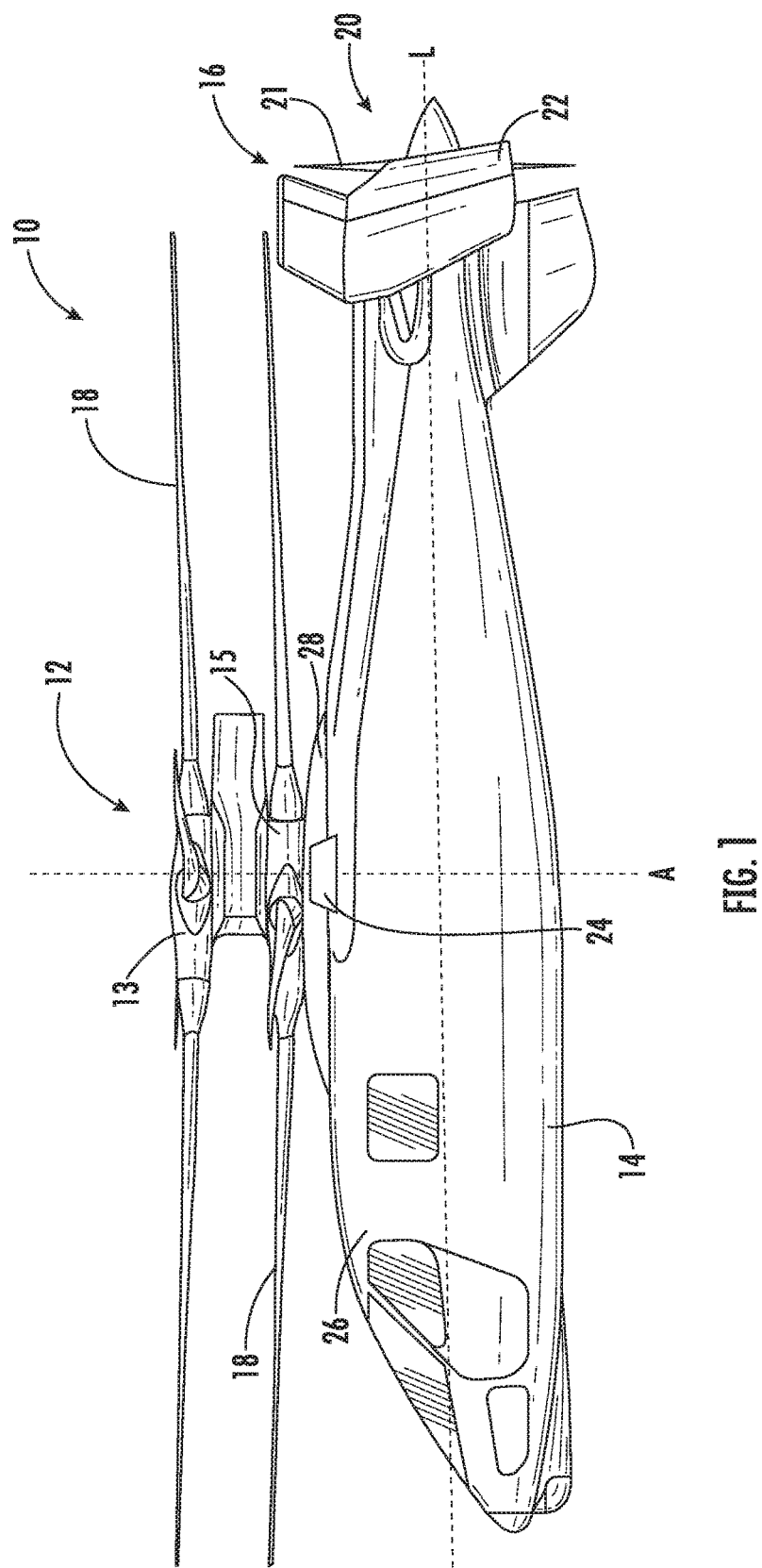
FIG. 1 is a perspective view of an exemplary rotary wing aircraft for use with embodiments of the invention.

Referring now to the drawings, FIG. 1 illustrates a vertical takeoff and landing (VTOL) rotary-wing aircraft 10 having a dual, counter-rotating, coaxial rotor system 12 and a translational thrust system 16. The aircraft 10 includes an airframe 14 which supports the dual, counter rotating, coaxial rotor system 12, which rotates about a rotor axis of rotation A, and the translational thrust system 16, which provides translational thrust generally parallel to an aircraft longitudinal axis, L. The coaxial rotor system 12 includes an upper rotor system 13 and a lower rotor system 15 and a plurality of rotor blades 18 connected thereto for rotation about the rotor axis of rotation A. Any number of blades 18 may be used with the rotor system 12. The translational thrust system 16 includes a pusher propeller 20 mounted at an aerodynamic tail fairing 22 and also includes a plurality of propeller blades 21. The translational thrust system 16 may be mounted to the rear of the airframe 14 to provide thrust for high-speed flight. A main gearbox 24 (illustrated schematically) may be located above the aircraft cabin 26 and drives the rotor system 12. The translational thrust system 16 may be driven by the same main gearbox 24 that drives the coaxial rotor system 12. The main gearbox 24 is driven by one or more engines (illustrated schematically at 28). Although a tail mounted translational thrust system 16 is disclosed in this embodiment, it should be understood that other configurations and/or machines, such as high speed compound rotary wing aircraft with supplemental translational thrust systems, dual contra-rotating coaxial rotor system aircraft, tilt-rotors, tilt-wing aircraft and fixed wing aircraft will also benefit from embodiments of the invention.

Figure 2:
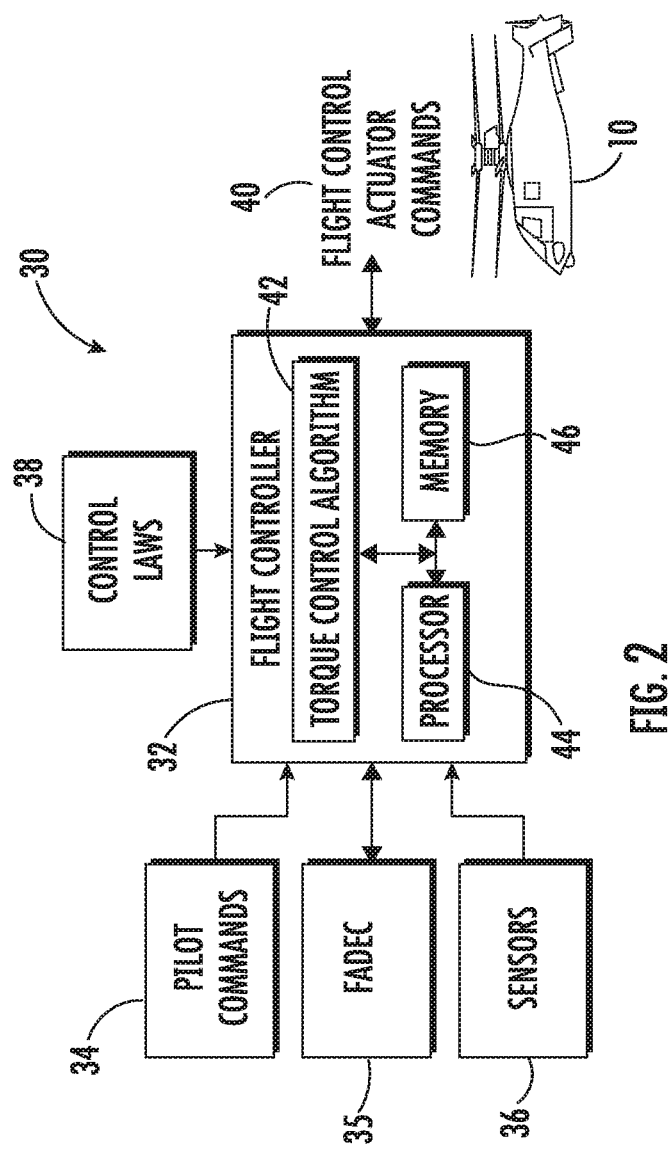
FIG. 2 is a schematic block diagram of an embodiment of a control system for a rotary wing aircraft.

FIG. 2 illustrates a control system 30 that provides, in an embodiment, a torque feedback loop closure in order to keep the propellers 20 (FIG. 1) at a constant torque. Control system 30 also provides a blade pitch command to propellers 20 (FIG. 1) that limits a pilot's command to change the propeller pitch such that the propeller thrust and propeller torque do not exceed structural limitations. The control system 30 implements a torque control algorithm 42 to provide control to the propellers 20 (FIG. 1) including implementing a torque control strategy and control circuitry that is described in the various embodiments herein. A schematic of a control system 30 to accomplish this is illustrated. Pilot commands/inputs 34 from pilot inceptors are received by a flight controller 32 as a commanded change to the propeller pitch. A number of sensors 36 are provided on aircraft 10 in order to sense flight conditions of aircraft 10 such as, in some non-limiting examples, propeller axial speed, propeller rotational speed, airspeed, measured thrust, measured torque, or the like. Data from sensors 36 is directed to flight controller 32 operably connected to sensors 36 where they are compared to control laws 38. Control laws 38 define flight control actuator commands 40 which result in the desired response e.g., actual torque and thrust for aircraft 10. In embodiments, the flight control commands 40 may be estimated from aircraft parameters or determined according to a schedule of propeller pitch commands as a function of propeller axial airspeed, propeller rotational speed, air density, thrust coefficients, and torque coefficients that are stored in memory 46 in one or more lookup tables. Control system 30 includes a Full Authority Digital Engine Controller (FADEC) 35 for each engine 28 (FIG. 1) to control engine speed and torque. In an embodiment, control system 30 uses FADEC 35 and data from pilot commands 34 and sensors 36 to control blade pitch and torque commands to the propeller 20 and keep propeller 20 rotating at a constant speed over varying flight conditions.

In an embodiment, controller 32 includes a memory 46. The memory 46 stores torque control algorithm 42 as executable instructions that is executed by processor 44. The instructions may be stored or organized in any manner and at any level of abstraction, such as in connection with the execution of the torque control algorithm 42. Processor 44 may be any type of processor (CPU or GPU), including a general purpose processor, a digital signal processor, a microcontroller, an application specific integrated circuit, a field programmable gate array or the like. Also, in embodiments, memory 46 may include random access memory (RAM), read only memory (ROM), or other electronic, optical, magnetic or any other computer readable medium onto which is stored torque control algorithm 42 described below.

Figure 3:
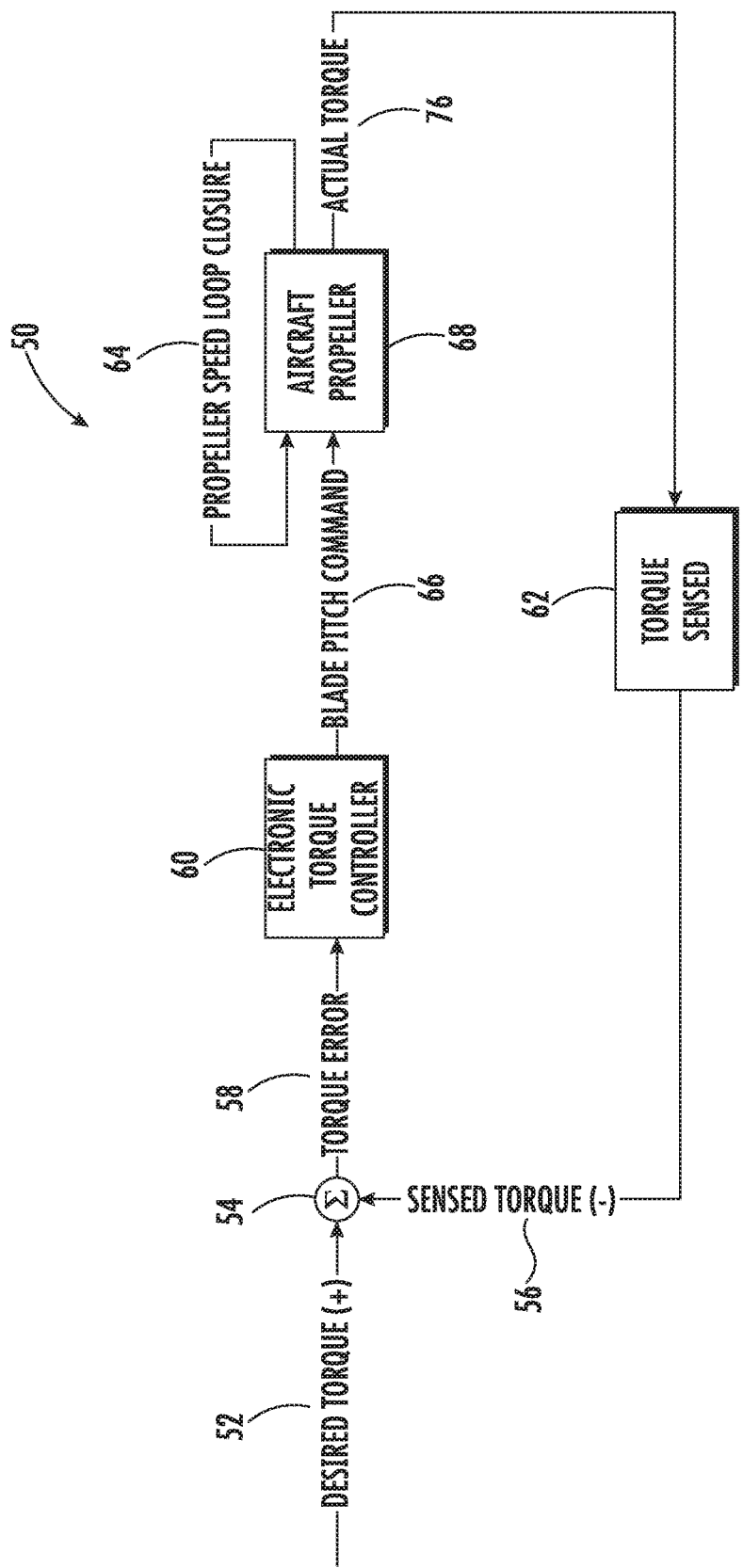
FIG. 3 is a schematic block diagram of a torque control law of the control algorithm of FIG. 2 according to an embodiment of the invention.

FIG. 3 illustrates a schematic view of a torque control strategy 50 as part of torque control algorithm 42 that is implemented by Flight Controller 32 for providing blade pitch commands to the propeller 20 according to an embodiment of the invention. Initially, a signal for a torque error value 58 is determined in Summation block 54. Torque error value 58 is the difference between a reference signal for a desired torque 52 and a signal representing measured/actual torque 56 received from torque sensor block 62. The torque sensor 62 determines the actual torque 70 (sensed torque) at the propeller 20 (FIG. 1). The error value 58 is fed as a signal to a torque controller block 60. Torque controller block 60 determines data that represents a corrected pitch command 66 for collective pitch control of propeller 20 (FIG. 1). The torque controller 60 processes the error value 58 through iterative cycles and multiplies it by a gain(s) to arrive at a signal that represents a calculated blade pitch command 66. The blade pitch command 66 represents a degree of change in attitude of propeller blade 21 for propeller 20 (FIG. 1). Also, the FADEC 35 (FIG. 2) provides a rotor/propeller rotational speed loop closure 64 to keep propeller 20 (FIG. 1) rotating at a constant speed. As illustrated, torque control strategy 50 is an iterative process for determining the propeller blade pitch commands 66 to be applied to the propeller 20 (FIG. 1) in order to achieve a desired torque setting 52 of propeller 20 (FIG. 1) and maintain a constant rotational speed thereby maximizing flight efficiency in varying flight conditions and provide the pilots with care-free maneuvering capability.

Figure 4:
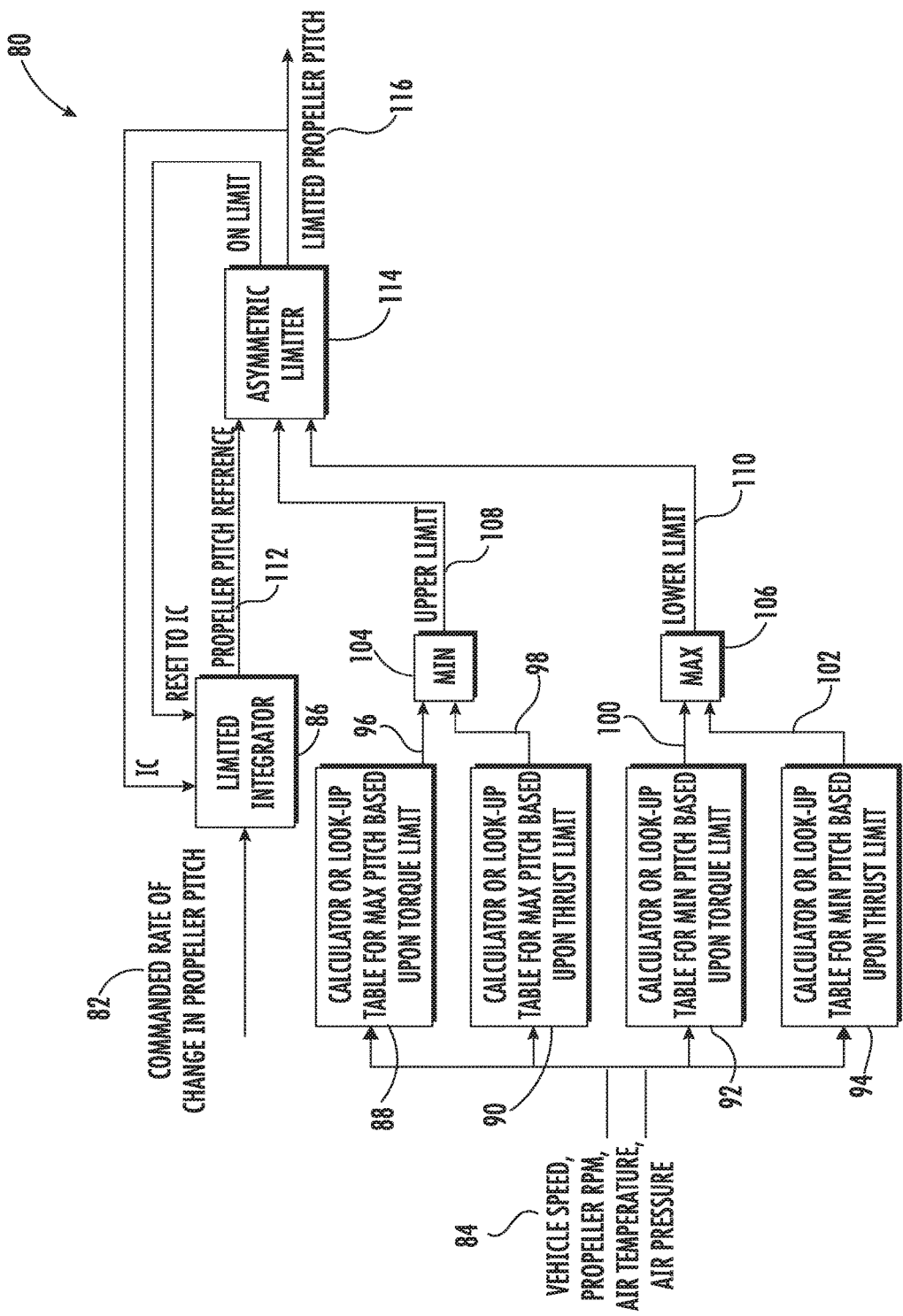
FIG. 4 is a schematic block diagram for implementing the control algorithm of FIG. 2 according to an embodiment of the invention.

FIG. 4 illustrates an exemplary schematic block diagram 80 for implementing torque control algorithm 42 for implementation by flight controller 32 (FIG. 2) in order to determine blade pitch commands 116 for controlling actuators of propeller blades 21 to stay within predefined thrust and torque limits. As such, FIG. 2 is also being referenced in the description of FIG. 4. Blade pitch commands 116 utilize a schedule of predefined thrust and torque limits for commanded propeller pitch. The predefined limits are accessed by torque control algorithm 42 from a plurality of lookup tables 88, 90, 92, and 94 that are stored in memory 46.

In an embodiment, implementation of torque control algorithm 42 begins when flight controller 32 receives and stores signal inputs 82 for a commanded rate of change in propeller pitch received from pilot inceptors 34. Constants for each of a pitch kinematics upper limit and a pitch kinematics lower limit are applied to limited integrator 86 such that the output of limited integrator 86 is a commanded propeller collective pitch reference signal 112 that is bounded within these limits.

Signal inputs 84 for sensed flight conditions from sensors 36 are also received by flight controller 32. Signal inputs 84 can include Signal inputs 84 for sensed flight conditions from sensors 36 are also received by flight controller 32. Signal inputs 84 can include propeller axial speed (i.e., vehicle speed), propeller rotational speed, air temperature, and air density.

Lookup tables 88-94 include estimated values for upper and lower pitch command limits based on thrust and torque values that are predefined for rotorcraft 10 (FIG. 1). These estimated values may be predetermined or derived from, in some non-limiting examples, simulated data, or flight test data. For example, lookup table 88 includes upper limits on propeller pitch command based on a maximum torque, lookup table 90 includes predefined values for upper limits on propeller pitch command based on a maximum thrust, lookup table 92 includes lower limits on propeller pitch command based on a minimum torque, and lookup table 94 includes lower limits on propeller pitch command based on a minimum thrust. Lookup table 88 provides a signal 96 that is an estimate for an upper limit of propeller pitch command for a maximum torque value. Lookup table 90 provides a signal 98 that is an estimate of an upper limit for a propeller pitch command for a maximum thrust value. These signal values 96, 98 are compared in minimum block 104, and the minimum of the two values is passed as a signal 108 on to asymmetric limiter 114 as its upper limit. Also, lookup table 92 provides a signal 100 that is an estimate for a lower limit of a propeller pitch command for a maximum torque value and lookup table 94 provides a signal 102 that is an estimate for a lower limit for a propeller pitch command for a minimum thrust value. These values 100, 102 are compared in maximum block 106 and the maximum of the two values is passed as signal 110 on to asymmetric limiter 114 as its lower limit. The asymmetric limiter 114 determines if the commanded propeller collective pitch reference signal 112 from a pilot may subject the propeller or its supporting structure to excess stresses and imposes the respective upper and lower pitch command limits 108, 110 on the commanded collective pitch 112. Output signal 116 represents blade pitch commands that are implemented on actuators for controlling blade pitch of propellers blades 21.

Figure 5:
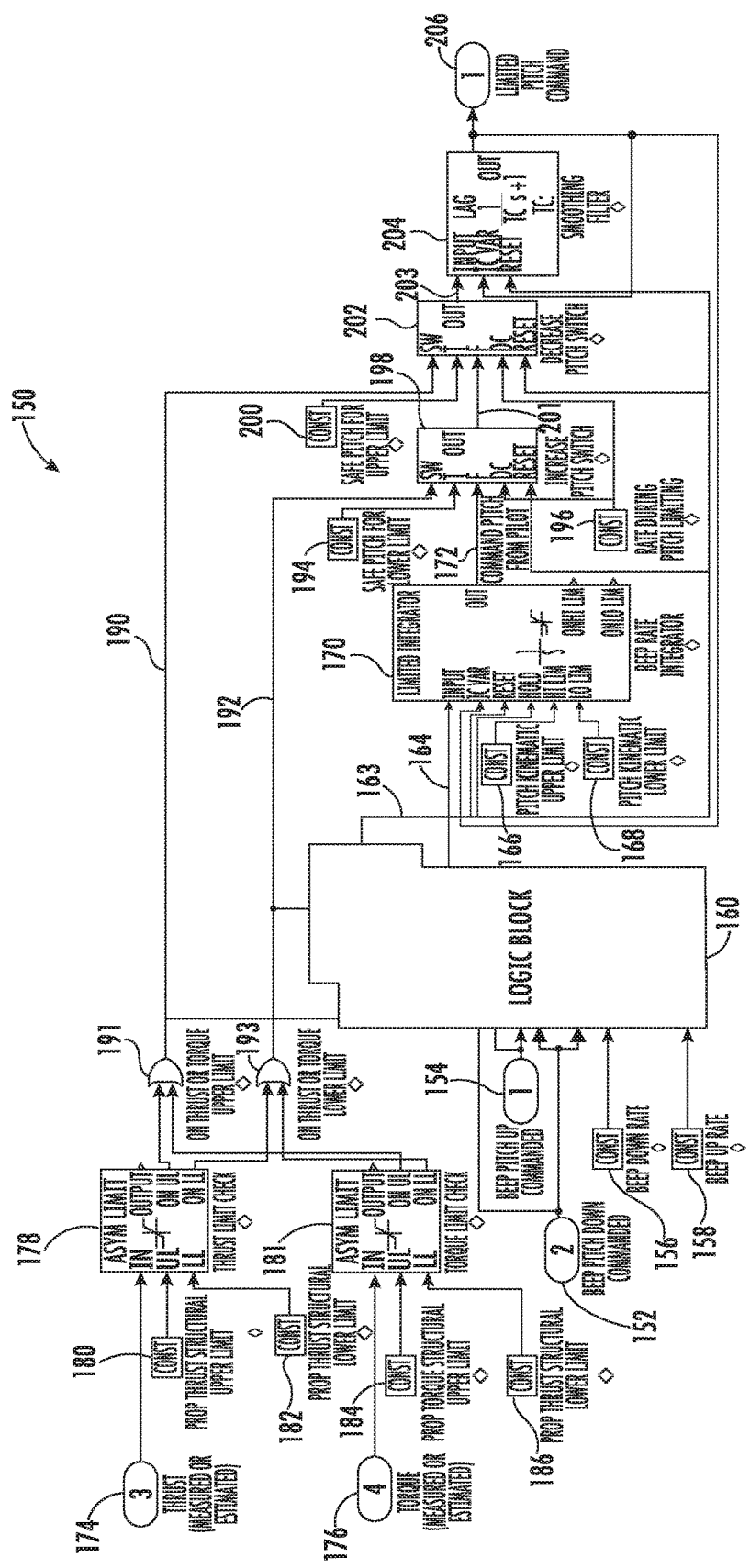
FIG. 5 is a schematic block diagram for implementing the control algorithm of FIG. 2 according to an embodiment of the invention.

FIG. 5 illustrates a schematic block diagram of circuitry 150 for implementing torque control algorithm 42 by Flight Controller 32 (FIG. 2) for providing limited propeller pitch command signal 206 to propeller 20 according to an embodiment of the invention. As such FIG. 2 is also referenced in the description of FIG. 5. Blade pitch commands 206 control blade pitch of propeller blades 21 through propeller pitch commanded inputs and measured torque values. In an embodiment, implementation of torque control algorithm 42 begins when Flight Controller 32 receives and stores signal inputs such as, for example, pilot commanded rate of change in propeller pitch. As an alternative, estimated values for thrust 174 and torque 176 can be used in lieu of measured values of thrust 174 and torque 176 respectively. These estimated values may be predetermined or derived from, in some non-limiting examples, simulated data, or flight test data. Thrust 174, signal 180, and signal 182 are applied to an asymmetric thrust limiter block 178. Also, torque 176, signal 184, and signal 186 are applied to an asymmetric torque limiter block 181. Signal 180 is a predetermined or defined constant value for an upper structural limit of propeller thrust while signal 182 is a predetermined or define constant value for a lower structural limit of propeller thrust. Further, signal 184 is a predetermined or defined constant value for an upper structural limit of propeller torque while signal 186 is a predetermined or defined constant value for a lower structural limit of propeller torque.

Also depicted in FIG. 5, a beep pitch down command 152, a beep pitch up command 154, beep down rate 156, and beep up rate 158 are applied to a logic block 160. Also, Boolean value signal 190 (output from OR-gate 191) and Boolean value signal 192 (output from OR-gate 193) are applied to logic block 160. Beep pitch commands 152 and 154 represent a commanded rate of change in collective pitch that is received through pilot inceptors. In an embodiment, logic block 160 compares the commanded rate of change in propeller pitch to the status of the limiting algorithm as a means of rapidly resetting a reference signal 172 representing a pilot commanded value of propeller pitch (also called a reference signal). Output signal 164 represents a defined magnitude of a beeper rate to be applied to a limited integrator block 170. In an alternative embodiment, output signal 164 can include a variable magnitude for the beeper rate. Output signal 164 is provided to a limited integrator block 170 together with signal 163, pitch kinematic upper limit signal 166, and pitch kinematic lower limit signal 168. Output signal 172 from limited integrator block 170, signal 194 representing a predetermined or defined safe value for a lower limit of pitch command, signal 192, signal 163, and signal 196 representing a predetermined or defined prescribed rate for pitch limiting are applied to an increase pitch switch block 198 for comparison. Output signal 201 representing commanded value of propeller pitch, signal 200 representing a predetermined or defined safe value for an upper limit of pitch command, signal 192, signal 196, and signal 163 are applied to a decrease pitch switch block 202 for comparison. In an embodiment of the invention, blocks 198 and 202 can include rates, in lieu of signal 196 for prescribed rate, which are proportional to the difference between the thrust signal 174 and its limits 180, 182 and/or proportional to the difference between the torque signal 176 and its limits 184, 186. Output signal 203 from decrease pitch switch block 202, feedback signal for limited propeller pitch command signal 206, and signal 163 are filtered in a smoothing filter block 204 to provide a limited propeller pitch command signal 206.

In operation, if either the thrust signal 174 (measured or estimated) or the torque signal 176 (measured or estimated) is greater than their respective upper limit signals 180 and 184, then signal 190 is TRUE and the pilot's commanded value of propeller pitch 172 (or reference signal) is driven down towards a safe value signal 194 at a prescribed rate signal 196 resulting in output signal 201. Similarly, if either the thrust signal 174 (measured or estimated) or the torque signal 176 (measured or estimated) is lesser than their respective lower structural limit signals 182 and 186, then signal 192 (output from OR-gate 193) is TRUE and signal 201 representing a commanded value of propeller pitch 201 is driven up towards a safe value signal 200 at a prescribed rate through signal 196 resulting in output signal 203. Signal 203 is passed through a smoothing filter block 204 to obtain a limited propeller pitch command signal 206. In addition, if the pilot's input beep pitch command signals 152, 154 are also persistently in a direction consistent with the automatic limiting as determined by comparison to signals 190 and 192, then signal 163 initiates a reset of the integrator block 170 and the smoothing filter block 204 in order to align the propeller pitch reference signal 172 with the limited propeller pitch command 206.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to rotorcraft, and can be used in wind turbines, engine turbines, and other systems with rotary elements. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling a propeller of an aircraft, comprising:

receiving, with a processor, one or more signals indicative of commanded collective pitch of the propeller associated with a desired torque;

receiving, with the processor, one or more sensed signals from at least one sensor mounted to the aircraft, one or more sensed signals being indicative of propeller axial speed, propeller rotational speed, and air density;

estimating, with the processor, a propeller torque and propeller thrust from one or more of the propeller axial speed, the propeller rotational speed, and the air density;

determining, with the processor, information indicative of an error value between a desired torque and a measured torque in the propeller;

determining, with the processor, information indicative of a corrected pitch command in response to the determining of the error value;

combining, with the processor, the corrected pitch command with the propeller rotational speed into an adjustment solution, the propeller rotational speed being governed by a full authority engine controller;

providing, with the processor, the propeller with the adjustment solution, wherein providing the propeller with the adjustment solution includes changing an attitude of one or more propeller blades of the propeller while maintaining a constant rotational speed of the propeller;

receiving, with the processor, a subsequent error value between the desired torque and the measured torque in response to the providing of the adjustment solution.

2. The method of claim 1, further comprising determining an estimated upper limit of a collective pitch as a function of maximum torque and maximum thrust from a predefined schedule.

3. The method of claim 2, further comprising determining an estimated lower limit for the collective pitch as a function of minimum torque and minimum thrust from a predefined schedule.

4. The method of claim 3, further comprising determining each of an upper limit collective pitch command and a lower limit collective pitch command from the estimated upper and lower limits.

5. The method of claim 1, further comprising adjusting the corrected pitch command as a function of at least one of the commanded collective pitch, the propeller axial speed, and the propeller rotational speed.

6. The method of claim 1, further comprising determining a pitch rate from the commanded collective pitch, the estimated torque, and the estimated thrust.

7. The method of claim 6, further comprising applying each of a lower limit constant value and pitch rate limiting value to the commanded collective pitch to drive down the commanded collective pitch to the lower limit constant value, the lower limit constant value representing a lower limit of a collective pitch.

8. The method of claim 7, further comprising applying the lower limit constant value if at least one of the propeller thrust or the propeller torque is greater than its respective upper limit value.

9. The method of claim 6, further comprising applying each of an upper limit constant value and pitch rate limiting value to the commanded collective pitch to drive up the commanded collective pitch to the upper limit constant value, the upper limit constant value representing an upper limit of a collective pitch.

10. The method of claim 9, further comprising applying the upper limit constant value if at least one of the propeller thrust or the propeller torque is lesser than its respective lower limit value.

11. A system for controlling a plurality of propeller blades of an aircraft, comprising
a propeller comprising the plurality of blades, wherein the propeller is associated with a sensor;
a processor; and
memory having instructions stored thereon that, when executed by the processor, cause the system to:
receiving one or more signals indicative of commanded collective pitch of the propeller associated with a desired torque;
receive one or more sensed signals indicative of propeller axial speed, propeller rotational speed, and air density;
determine information indicative of an error value between the desired torque and a measured torque in the propeller;
determine information indicative of a corrected pitch command in response to the determining of the error value;
combine the corrected pitch command with the propeller rotational speed into an adjustment solution, the propeller rotational speed being governed by a full authority engine controller;
provide the propeller with the adjustment solution, wherein providing the propeller with the adjustment solution includes changing an attitude of one or more of the plurality of blades while maintaining a constant rotational speed of the propeller; and
receive a subsequent error value between the desired torque and the measured torque in response to the providing of the adjustment solution.

12. The system of claim 11, wherein the processor is configured to determine an estimated upper limit of a collective pitch as a function of maximum torque and maximum thrust from a predefined schedule.

13. The system of claim 12, wherein the processor is configured to determine an estimated lower limit for the collective pitch as a function of minimum torque and minimum thrust from a predefined schedule.

14. The system of claim 13, wherein the processor is configured to determine each of an upper limit collective pitch command and a lower limit collective pitch command from the estimated upper and lower limits.

15. The system of claim 11, wherein the processor is configured to adjust the corrected pitch command as a function of at least one of the commanded collective pitch, the propeller axial speed, and the propeller rotational speed.

16. The system of claim 11, wherein the processor is configured to estimate a torque and thrust from one or more of the propeller axial speed, the propeller rotational speed, and the air density.

17. The system of claim 11, wherein the processor is configured to determine a pitch rate from the commanded collective pitch, the estimated torque, and the estimated thrust, and apply each of a lower limit constant value and a pitch rate limiting value to the commanded collective pitch to drive down the commanded collective pitch to the lower limit constant value, the lower limit constant value representing a lower limit of a collective pitch.

18. The system of claim 17, wherein the processor is configured to apply the lower limit constant value if at least one of the propeller thrust or the propeller torque is greater than its respective upper limit value.

19. The system of claim 11, wherein the processor is configured to determine a pitch rate from the commanded collective pitch, the estimated torque, and the estimated thrust, and apply each of an upper limit constant value and pitch rate limiting value to the commanded collective pitch to drive up the commanded collective pitch to the upper limit constant value, the upper limit constant value representing an upper limit of a collective pitch.

20. The system of claim 19, wherein the processor is configured to apply the upper limit constant value if at least one of the propeller thrust or the propeller torque is lesser than its respective lower limit value.

* * * * *